BERTHOLD HAJEN

Inventor.

BY Karl F. Ross

AGENT

May 9, 1967 B. HAJEN 3,319,236

FLUID BEARING MAGNETIC RECORDING DRUM

Filed May 14, 1963 3 Sheets-Sheet 2

BERTHOLD HAJEN
Inventor.

BY Karl G. Ross
AGENT

BERTHOLD HAJEN
Inventor.
BY Karl G. Ross
AGENT

United States Patent Office 3,319,236

Patented May 9, 1967

3,319,236

FLUID BEARING MAGNETIC RECORDING DRUM

Berthold Hajen, Sande, Germany, assignor to Olympia Werke A.G., Wilhelmshaven, Germany, a corporation of Germany Filed May 14, 1963, Ser. No. 280,305

Claims priority, application Germany, May 19, 1962, O 8,762

8 Claims. (Cl. 340—174.1)

My present invention relates to magnetic recording drums for the storage of information and, in particular, to a system for the recording or the reading of such information with the aid of suitable transducer heads.

For high-fidelity recording or reproducing it is necessary that each transducer head should bear upon the drum surface, rotating relatively to the transducer head, under a substantially constant pressure even if the periphery of the drum is not a perfect cylinder or other figure of rotation. The general object of my invention is therefore to provide means for insuring the uniformity of contact pressure between a drum surface and one or more reading or recording heads, rotating relatively thereto about the drum axis, by a simple and inexpensive arrangement applicable equally well to a single transducer head and to a multiplicity thereof.

An ancillary object of my invention is to provide means in such system for insuring adequate lubrication of the drum surface before and during the development of contact pressure between the transducer heads and the drum.

It is also an object of this invention to provide means for limiting the contact pressure to a predetermined maximum and for instantly relieving that pressure when necessary, e.g. in the event of a malfunction or preparatorily to removal of the drum from its mounting.

The foregoing objects are realized, pursuant to my instant invention, by the provision of a preferably cylindrical housing which surrounds the drum with limited peripheral clearance and has the transducer head or heads lodged in its wall with freedom of sliding motion in a generally radial direction, i.e. toward and away from the drum axis, in combination with pneumatic and/or hydraulic means for establishing across this wall a pressure differential urging the slidable recording heads into contact with the drum surface.

In principle, the aforementioned pressure differential can be produced in either of two ways, i.e. by the creation of suction inside the drum housing or by the application of pressure to its exterior; in the latter instance the housing itself must be enclosed in a further shell into which the pressure fluid (usually air) is to be admitted.

Proper lubrication of the drum surface can be insured in the first instance, i.e. with the housing subjected to a partial vacuum, by the continuous injection of an oil spray trained onto the rotating drum periphery to form a thin oil film thereon, the remainder of the clearance between the drum and its housing being filled with air. In the second instance, i.e. when air pressure is exerted upon the slidable transducer heads from without, this clearance may be occupied substantially entirely by the lubricant.

The invention will be described in greater detail with reference to the accompanying drawing in which.

Figure 1:
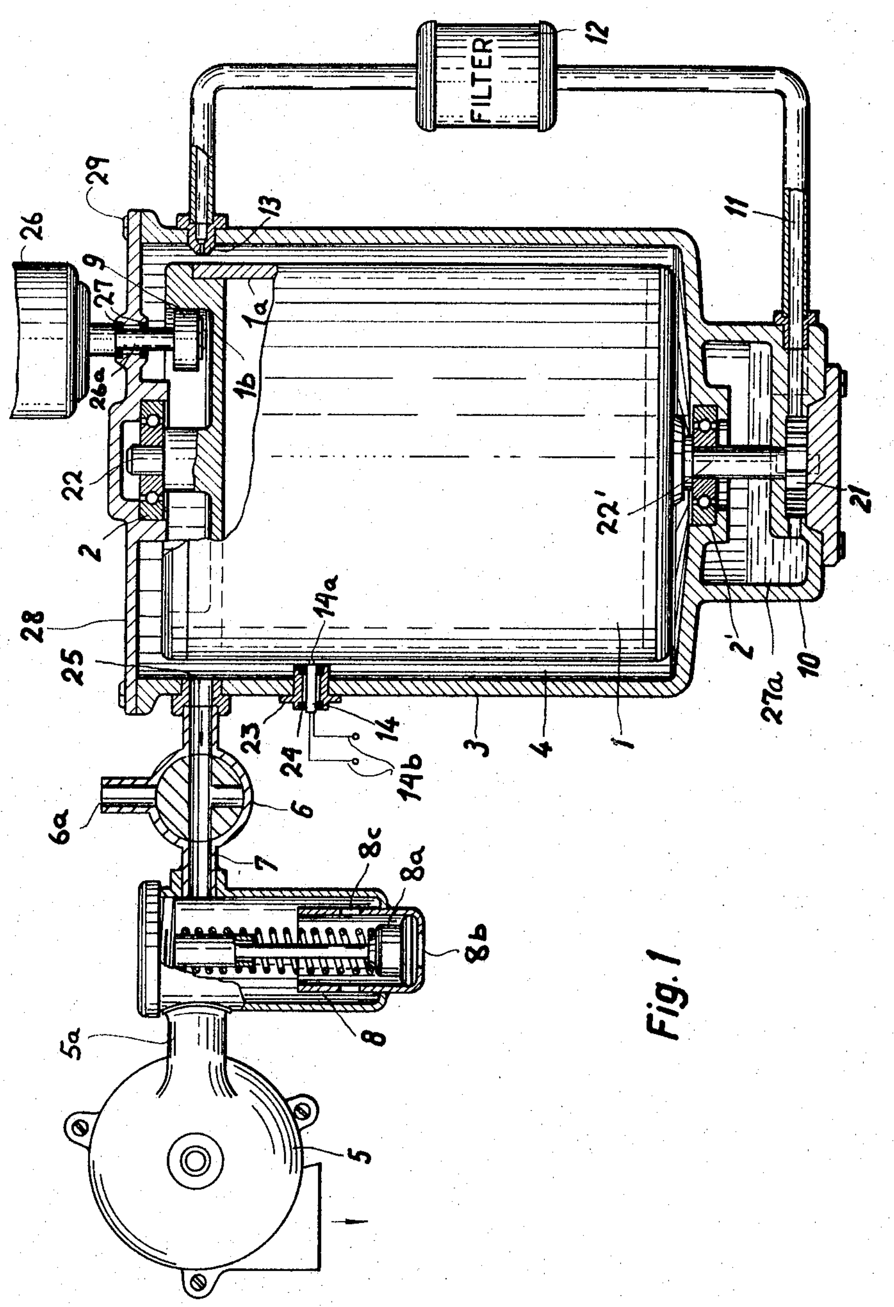
FIG. 1 is an elevational view, partly in section, of a system of the character referred to above, including a recording drum rotatable about a vertical axis.

The system shown in FIG. 1 comprises a drum 1 of the usual magnetizable material, at least in its peripheral portion *1a*, whose gudgeons 22, 22' are journaled by means of ball bearings 2, 2' in a generally cylindrical housing 3 for rotation about a vertical axis. A small annular clearance 4 is present between the peripheral housing wall and the magnetizable drum surface. Into this clearance project radially one or more transducer heads 14 (only one shown) is slidably mounted in a fluid-tight fitting 23 provided with annular gaskets 24. Transducer head 14 is constituted by a cylindrical coil body surrounding a ferromagnetic core **14*a*, the coil body having leads 14*b*** for connection to an external circuit not shown. This external circuit, as is readily understood by persons skilled in the art, may include means (e.g. an amplifier) for modulating a signal current in the case of a recording head or means (e.g. a relay) responsive to stored information in the case of a pick-up head.

An air-circulating device, here shown as a blower 5, has its low-pressure port **5*a* connected via a conduit 7 to the clearance 4 by way of a port 25 in the peripheral wall of housing 3. Conduit 3 contains a three-way cock 6 in series with a relief valve 8, the latter including a spring-loaded plunger 8*a* which unblocks a passage 8*b*, 8*c* for the entrance of atmospheric air into the conduit 7 as soon as the partial vacuum in that conduit, and therefore in the space 4, has reached a certain limiting value. Blower 5** is driven from any suitable power source not shown.

The relative rotation between drum 1 and housing 3 is brought about by a motor 26 whose shaft **26*a* enters the top wall of the housing through an airtight fitting represented by annular gaskets 27, this shaft carrying a friction roller 9 in contact with an inner peripheral surface 1*b* of the drum. The rotation of the drum is also communicated to a gear pump 21 which is secured to the gudgeon 22' within a lower extension of housing 3, this gear pump working into a pipe 11 for the circulation of oil from a sump 27*a* in housing extension 10 via a filter 12 to a nozzle 13 near the upper end of the peripheral housing wall. The oil delivered under the pressure of gear pump 21 to the nozzle 13 is squirted onto the outer surface of the upper end of peripheral drum portion 1*a* to form a film thereon as the oil spray flows downward on that surface. In this manner a layer of lubricant is spread over the entire outer surface of drum portion 1*a* as soon as the drive motor 26** begins to operate.

When the blower 5 is set in motion, air is exhausted from the interior 4 of the housing 3 so that the resulting pressure differential across the peripheral housing wall urges the head 14 inwardly into contact with the oil-coated surface of the rotating drum 1. Recording or reading of the magnetically stored information may now be carried out in the usual manner. The oil film minimizes the wear of the recording surface as a further safeguard against incorrect recording or reading. The presence of a reduced tip, formed by the inwardly projecting end of core **14*a*, insures that differential pressure upon head 14** will be maintained even after the head contacts the drum and that chattering will thus be avoided.

The drum 1 may be readily extracted from the housing 3 upon removal of the lid 28 thereof which is held in place by screws 29. Such removal is facilitated by a venting of the space 4 through rotation of the three-way cock 6 into a position in which its port **6*a*, leading to the atmosphere, communicates with the housing port 25 which is simultaneously disconnected from the low-pressure port 5*a* of blower 5**.

Figure 2:
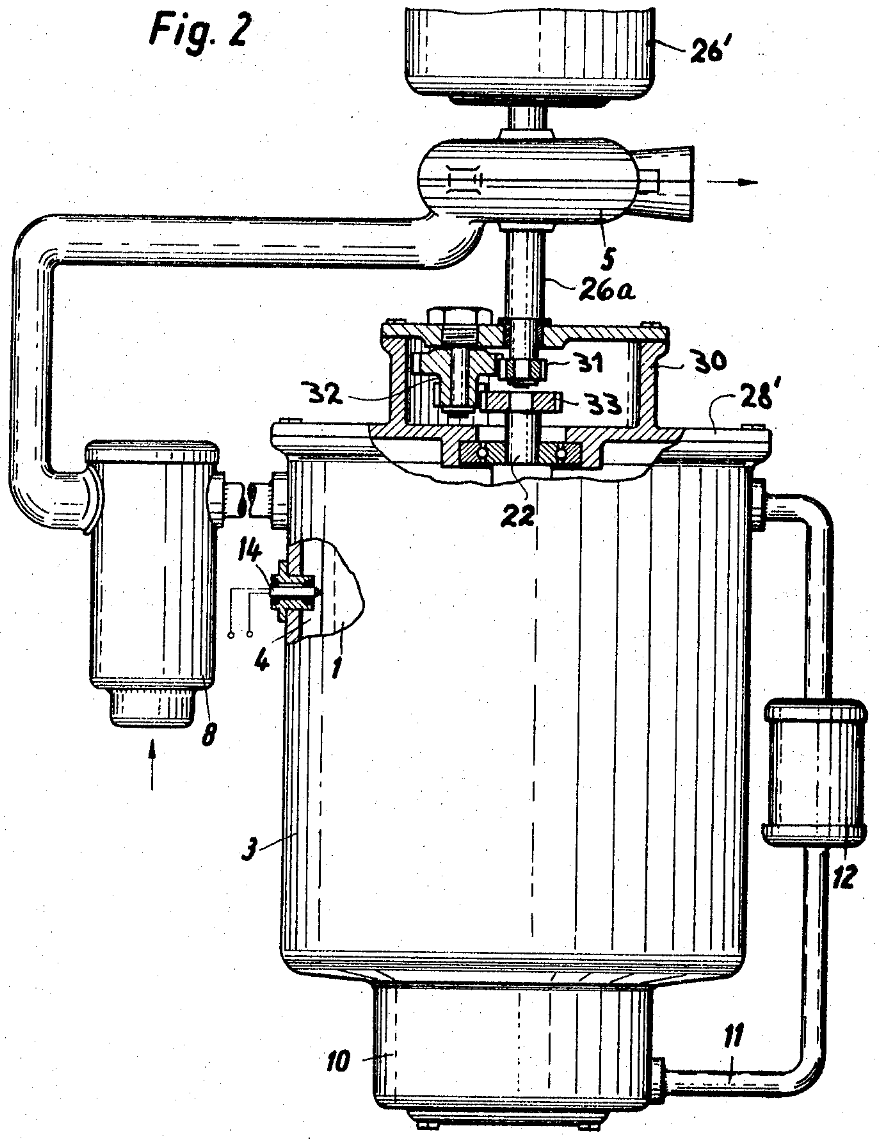
FIG. 2 is a view similar to FIG. 1, showing a partial modification.

In FIG. 2, the system illustrated in FIG. 1 has been modified to the extent that a motor 26', serving to rotate the drum 1, also drives the blower 5 at the same time. For this purpose the motor shaft **26*a*, after traversing the blower 5, enters an upper extension 30 of housing lid 28' and supports, within that extension, a pinion 31 meshing with a stepped gear 32 to drive a gear 33** on the gudgeon 22 of drum 1. In this case the operation of blower 5 is positively synchronized with that of drum 1 and gear pump 21 (FIG. 1) so that the formation of the afore-described oil film will take place before the partial vacuum in the previously vented space 4 has reached a value sufficient to press the recording head 14 firmly against the drum surface.

Figure 3:
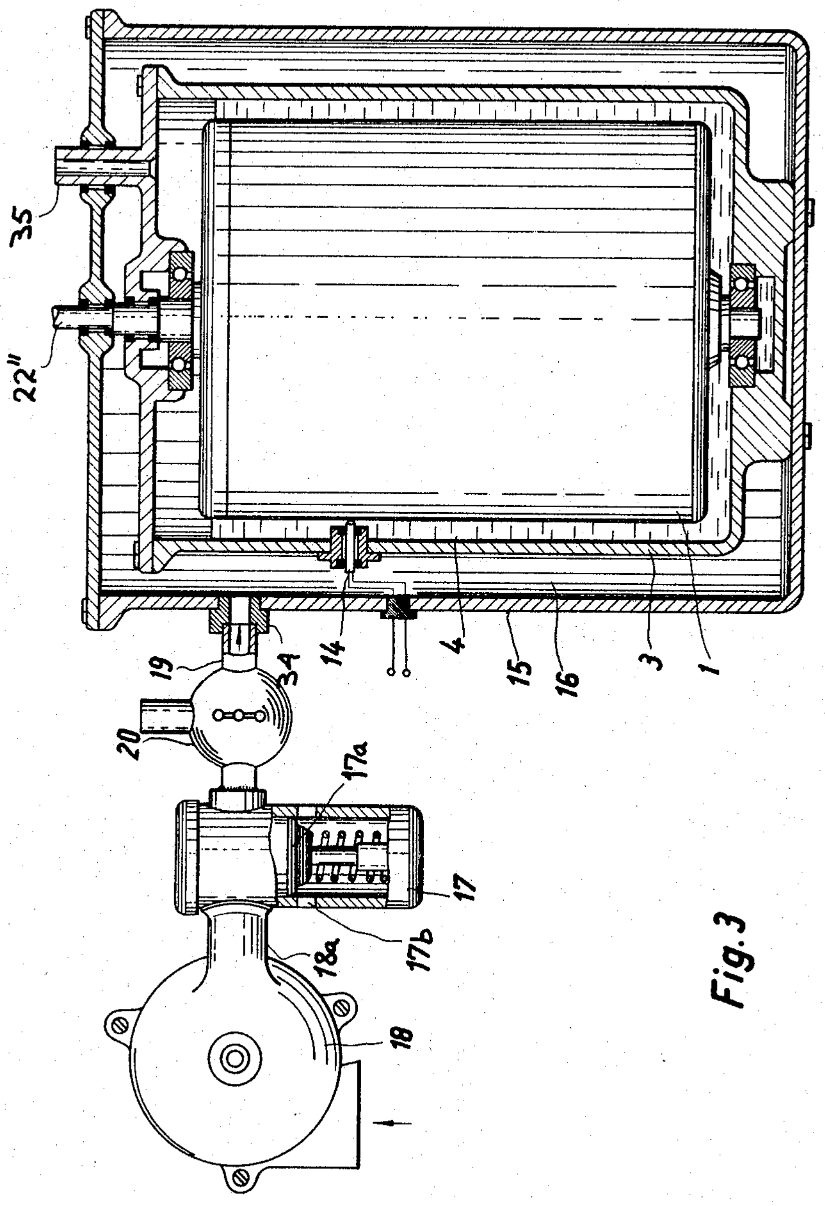
FIG. 3 is another view similar to FIG. 1, illustrating a further embodiment.

In FIG. 3 I have shown an alternate embodiment constituting in effect a reversal of the system shown in FIG. 1. Here the housing 3 enclosing the drum 1 is in its turn coaxially surrounded by a generally cylindrical shell 15 defining with it an annular space 16. A blower 18 has its high-pressure port 18*a* connected to a conduit 19 which terminates at a port 34 of shell 15. The relief valve 17 has a spring-loaded plunger 17*a* which unblocks a port 17*b*, thereby venting the conduit 19 and the space 16 to the atmosphere, as soon as the pressure inside space 16 exceeds a predetermined maximum. This pressure, as will be readily apparent, urges the transducer head 14 against the peripheral surface of drum 1 in the same manner as was done by the partial vacuum inside the housing in the preceding figures. A three-way cock 20, similar to cock 6 of FIG. 1, again serves for a rapid venting of the space 16 to relieve the contact pressure on head 14.

In FIG. 3, the drum 1 is rotated by a motor (not shown) whose shaft is coupled or integral with the upper gudgeon 22″. An inlet 35 of housing 3 allows for the introduction of oil into the space 4, the oil rising above the level of the transducer head 4 to lubricate the drum surface for the purpose previously described.

It will be understood that, if desired, the blower 18 may be synchronized with the drum drive in the system of FIG. 3, e.g. in the manner illustrated in FIG. 2, and that other modifications of the arrangements specifically described and illustrated, equally apparent to persons skilled in the art, are deemed to be embraced within the spirit and scope of my invention as defined in the appended claims.

I claim:

1. In combination, a magnetic recording drum, a housing surrounding said drum with limited peripheral clearance, drive means for relatively rotating said drum and said housing about an axis, at least one transducer head received in fluid-tight manner in the wall of said housing adjacent the drum periphery for sliding displacement toward and away from said axis, and blower means provided with a conduit communicating with a space on one side of said wall for creating across said wall an air-pressure differential urging said transducer head toward said drum periphery, said blower means being connected by said conduit to the interior of said housing as a suction generator.

2. The combination defined in claim 1, further comprising relief-valve means in said conduit for limiting the magnitude of said air-pressure differential.

3. The combination defined in claim 1, further comprising venting means in said conduit for selectively connecting said space with the atmosphere in place of said blower means.

4. The combination defined in claim 1, further comprising a source of lubricant and pump means coupled with said drive means for introducing said lubricant into said space and nozzle means for directing said lubricant onto the drum periphery as a coating therefor.

5. The combination defined in claim 4 wherein said drive means is coupled with both said blower means and said pump means for operating same upon rotation of said drum relative to said housing.

6. In combination, a magnetic recording drum, a housing surrounding said drum with limited peripheral clearance to form therewith a first fluid chamber, drive means for relatively rotating said drum and said housing about an axis, at least one transducer head received in fluid-tight manner in the wall of said housing adjacent the drum periphery for sliding displacement toward and away from said axis, a shell surrounding said housing with clearance and forming therewith a second fluid chamber and blower means provided with a conduit communicating with said second chamber for creating across said wall an air-pressure differential urging said transducer head toward said drum periphery.

7. In combination, a magnetic recording drum, a housing surrounding said drum with limited peripheral clearance, drive means for relatively rotating said drum and said housing about an axis, at least one transducer head received in fluid-tight manner in the wall of said housing adjacent the drum periphery for sliding displacement toward and away from said axis, blower means provided with a conduit communicating with a space on one side of said wall for creating across said wall an air-pressure differential urging said transducer head toward said drum periphery, and a shell spacedly surrounding said housing, said transducer head projecting outwardly from said wall into the space separating said housing from said shell, said blower means being connected by said conduit to the last-mentioned space as a pressure generator.

8. The combination defined in claim 7 wherein said axis is substantially vertical, the clearance between said housing and said drum being filled with a lubricant to a level above said transducer head.

References Cited by the Examiner

UNITED STATES PATENTS

| | | | |
|---|---|---|---|
| 3,060,431 | 10/1962 | Fuller et al. | 340—174.1 |
| 3,229,268 | 1/1966 | Solyst | 340—174.1 |

JAMES W. MOFFITT, *Acting Primary Examiner.*

BERNARD KONICK, *Examiner.*

A. I. NEUSTADT, *Assistant Examiner.*